United States Patent
Slutsky et al.

(10) Patent No.: US 11,627,353 B2
(45) Date of Patent: Apr. 11, 2023

(54) SYSTEM AND METHOD FOR SYNCHRONIZED PLAYING OF MEDIA ITEMS ON A PLURALITY OF REMOTE DEVICES

(71) Applicant: Deezer, S.A., Paris (FR)

(72) Inventors: Roman Slutsky, Tel Aviv (IL); Shay Goldberg, Herzlia (IL); Ori Segal, Givatayim (IL)

(73) Assignee: Deezer S.A., Paris (FR)

( * ) Notice: Subject to any disclaimer, the term of this patent is extended or adjusted under 35 U.S.C. 154(b) by 1052 days.

(21) Appl. No.: 16/328,190

(22) PCT Filed: Aug. 24, 2017

(86) PCT No.: PCT/IL2017/050944
§ 371 (c)(1),
(2) Date: Feb. 25, 2019

(87) PCT Pub. No.: WO2018/037415
PCT Pub. Date: Mar. 1, 2018

(65) Prior Publication Data
US 2019/0238911 A1    Aug. 1, 2019

Related U.S. Application Data

(60) Provisional application No. 62/379,271, filed on Aug. 25, 2016.

(51) Int. Cl.
*H04N 21/242* (2011.01)
*H04N 21/237* (2011.01)
(Continued)

(52) U.S. Cl.
CPC ......... *H04N 21/242* (2013.01); *H04N 21/237* (2013.01); *H04N 21/43076* (2020.08); *H04N 21/8547* (2013.01)

(58) Field of Classification Search
CPC ........... H04N 21/242; H04N 21/43076; H04N 21/237; H04N 21/8547
See application file for complete search history.

(56) References Cited

U.S. PATENT DOCUMENTS

| | | | |
|---|---|---|---|
| 7,818,770 | B2 | 10/2010 | Ducheneaut et al. |
| 2008/0291863 | A1 | 11/2008 | Agren |

(Continued)

FOREIGN PATENT DOCUMENTS

| | | |
|---|---|---|
| CN | 102742249 A | 10/2012 |
| WO | 2011092244 A1 | 8/2011 |

OTHER PUBLICATIONS

European Search Report from EP Application No. 17843065.8, dated Jan. 8, 2020.

(Continued)

*Primary Examiner* — Yassin Alata
(74) *Attorney, Agent, or Firm* — Jones Day

(57) ABSTRACT

Generally, a method and system for synchronized playing of a streamed media item on multiple remote devices are provided. The system may comprise a source device arranged to play and stream a media item and arranged to select at least one target device with which to share the media item thereof. The system may comprise a synchronization server in communication with the source device and with the at least one target device. The synchronization server may be arranged to: (i) determine a source average latency for the source device and a target average latency for each of the at least one target device; and (ii) determine, for each of the at least one target device, based on the source average latency and the respective target device's target average latency, a global time offset usable to synchronize playing of the media item thereof up to a predetermined accuracy.

22 Claims, 8 Drawing Sheets

(51) Int. Cl.
*H04N 21/8547* (2011.01)
*H04N 21/43* (2011.01)

(56) References Cited

U.S. PATENT DOCUMENTS

| 2012/0144435 A1* | 6/2012 | Spilo | H04N 21/43615 |
| | | | 725/78 |
| 2016/0173347 A1 | 6/2016 | Rajapakse | |
| 2018/0014071 A1* | 1/2018 | Richman | H04N 21/4828 |

OTHER PUBLICATIONS

Iternational Search Report and Written Opinion from International Application No. PCT/IL2017/050944, dated Dec. 24, 2017.

* cited by examiner

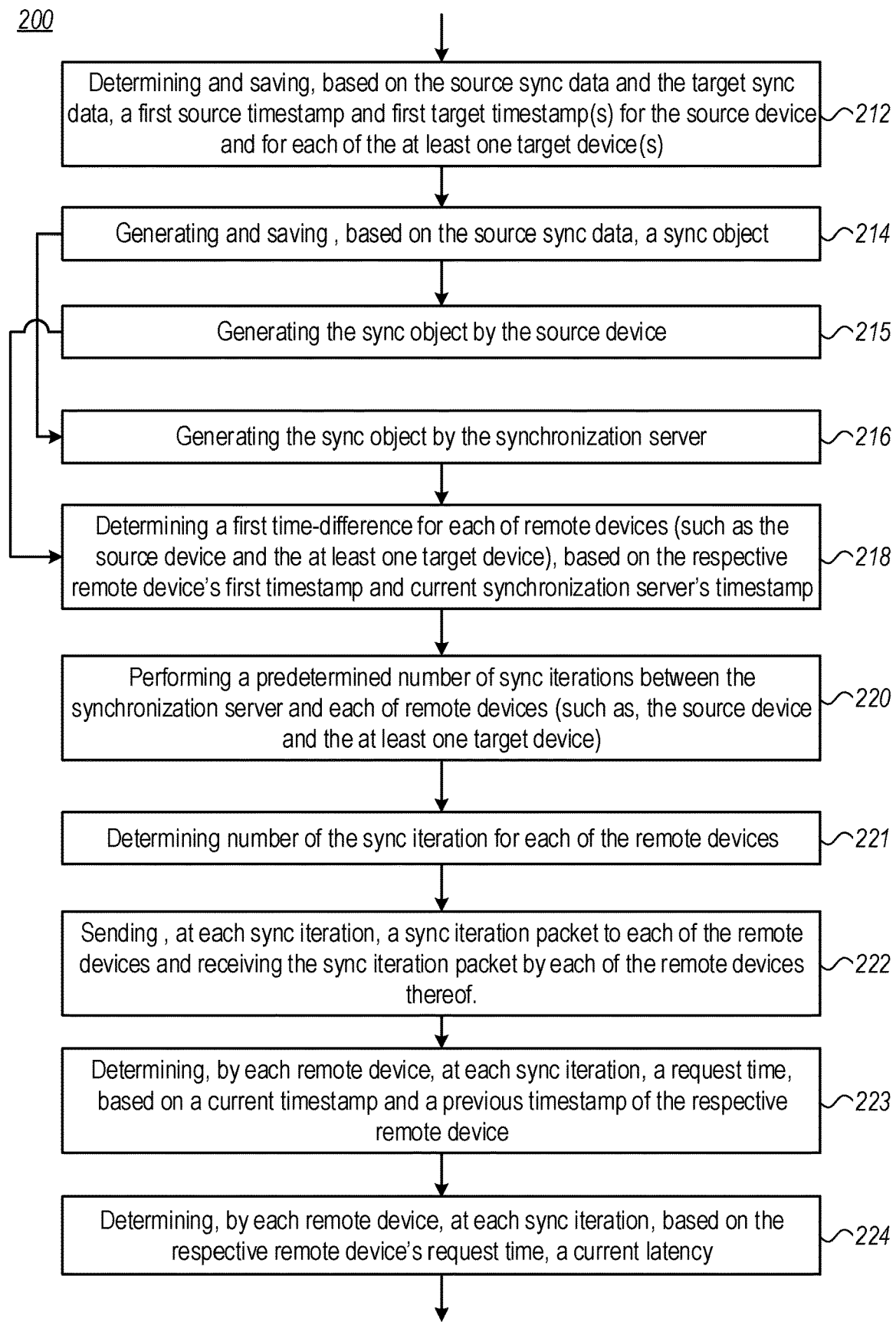
Figure 4 (cont. 1)

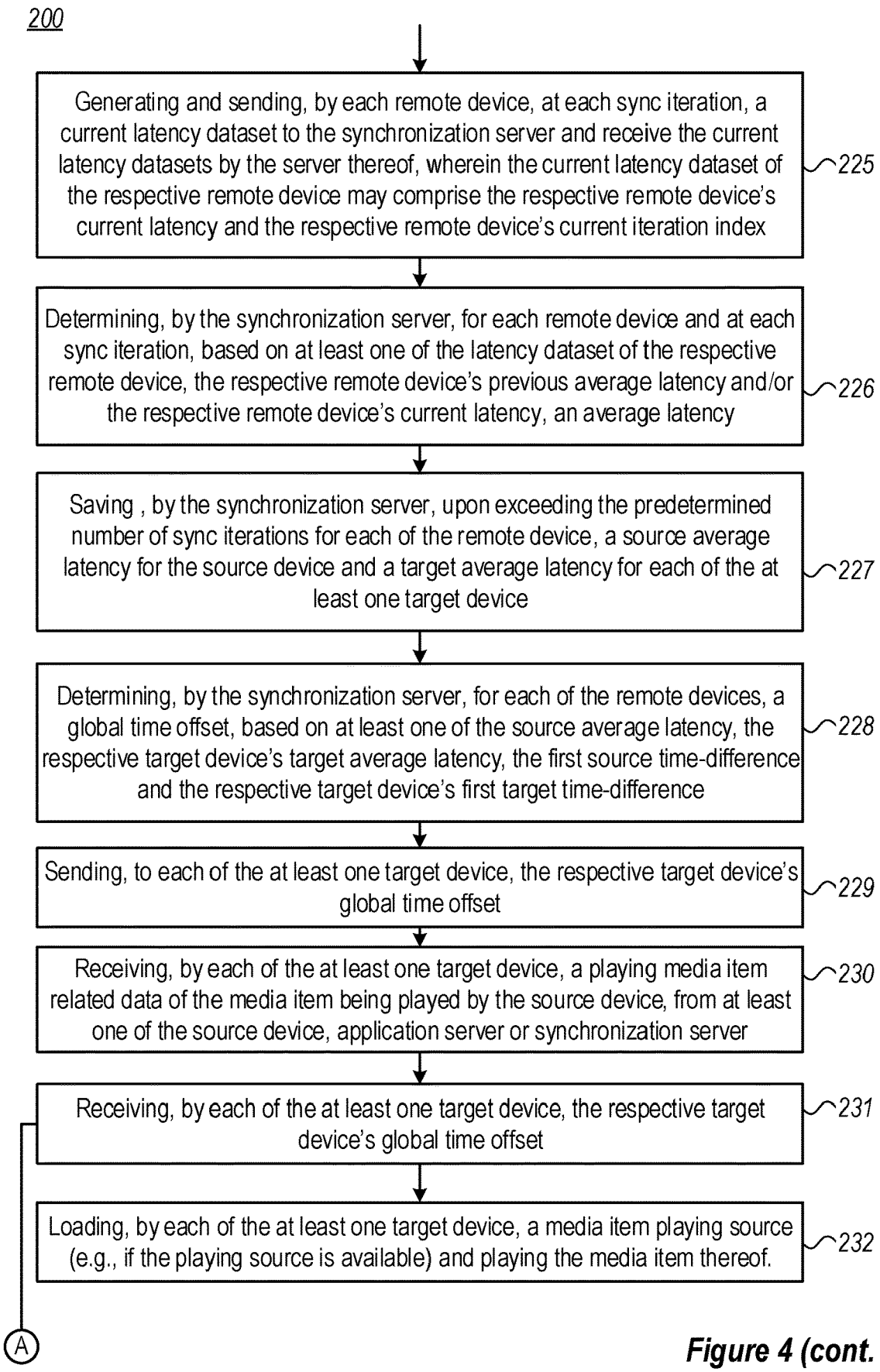
Figure 4 (cont. 2)

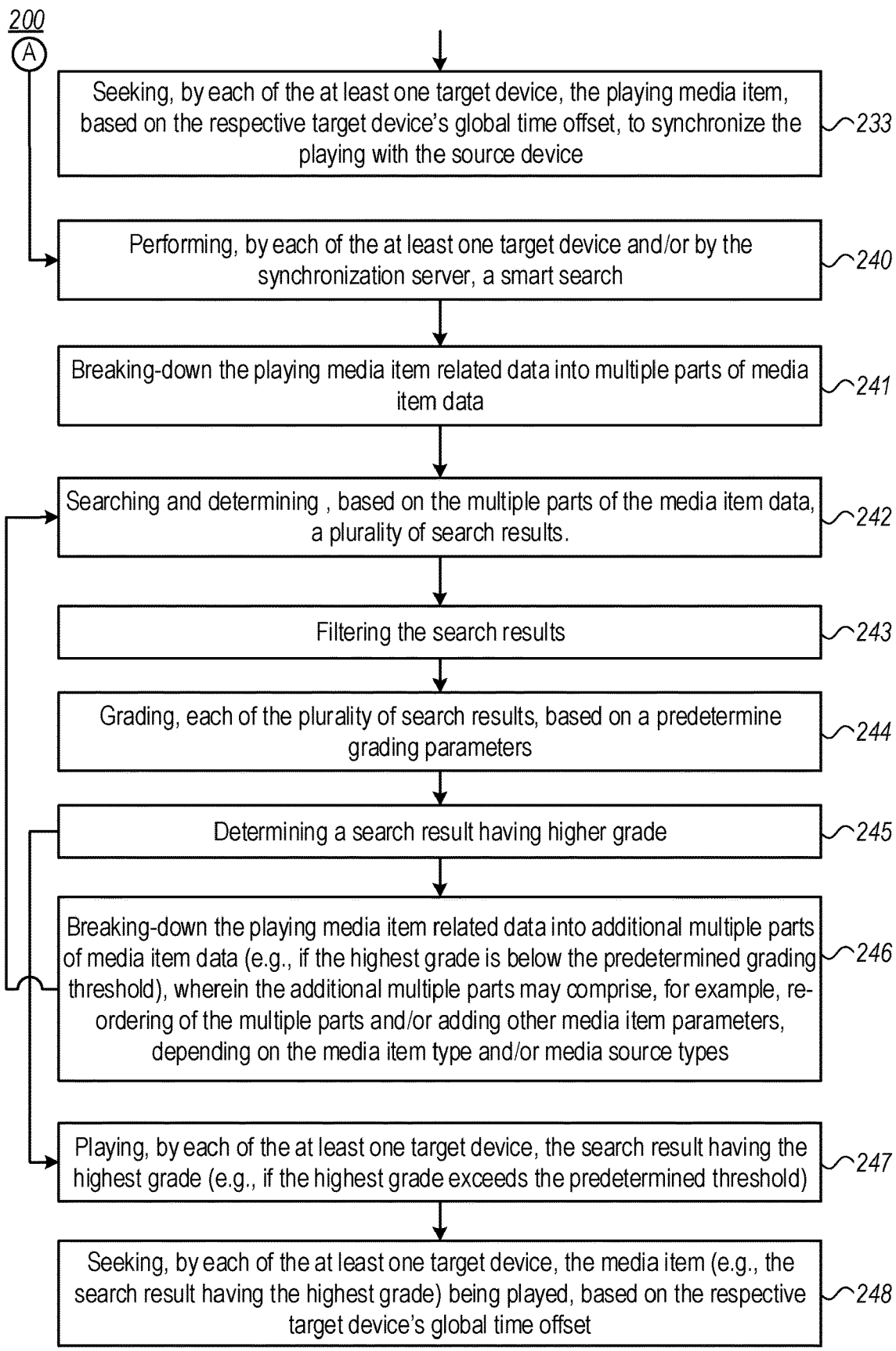
Figure 4 (cont. 3)

US 11,627,353 B2

SYSTEM AND METHOD FOR SYNCHRONIZED PLAYING OF MEDIA ITEMS ON A PLURALITY OF REMOTE DEVICES

This application is a National Stage Application of International Application No. PCT/IL2017/050944, filed 24 Aug. 2017, which claims the benefit of U.S. Provisional Patent Application Ser. No. 62/379,271, filed 25 Aug. 2016 in the United States and which applications are incorporated herein by reference. To the extent appropriate, a claim of priority is made to each of the above disclosed applications.

FIELD OF THE INVENTION

The present invention relates to the field of streaming media items, and more particularly, to methods and systems for synchronized playing of streamed media items on a plurality of remote devices.

BACKGROUND OF THE INVENTION

Current methods of sharing media items across multiple remote devices typically require sending, by a source device, a specific media item to multiple target devices or sharing, with the target devices, an URL of a specified location of the specific media item. The sending may be done using, for example, Bluetooth connection between the source and target devices. One disadvantage of current methods is that they do not support a remote synchronization. For example, Bluetooth connection may fail once the source and target devices are out of a specified range. Another disadvantage of current methods is that they do not support a real-time and synchronized experiencing of the shared media item by the respective remote users. For example, a song being sent via Bluetooth connection may not be simultaneously played on the source and target devices in a synchronized manner. Moreover, the target devices may require special credentials to access the specific media item or to access the specified location of the specific media item which in turn may impose further unsynchronized delay in playing that media.

Other current methods of sharing media items across multiple remote devices may involve streaming methods. Streaming methods may typically involve streaming, by the source device, a specific media item and receiving and playing, by multiple target devices, the streamed media item thereof. One problem with multiple remote devices playing the same specific media item is that a local clock of each remote device may have an inaccuracy with respect to a common reference clock, e.g. the UNIX time. The inaccuracy of each remote device may range, for example, between microseconds and seconds. The inaccuracy may depend on, for example, a setup of the device, actual throughput of the transmission channel used for conveying the media to a user, e.g. internet connection, cellular network provider, etc. Accordingly, one disadvantage of current streaming methods of sharing media is that they do not support a real-time and synchronized experiencing of the shared media item. According to some embodiments of the invention the term 'real-time' may refer to a time difference between successive events that is virtually not noticeable by the user, for example smaller than 0.01 seconds in the case of a user with good musical hearing.

SUMMARY OF THE INVENTION

One embodiment of the present invention provides a system for synchronized playing of a streamed media item, the system comprising: a source device arranged to play and stream a media item and arranged to select at least one target device with which to share the media item being played; and a synchronization server in communication with the source device and with the at least one target device, the synchronization server is arranged to: determine a source average latency for the source device and a target average latency for each of the at least one target device; and determine, for each of the at least one target device, based on the source average latency and the respective target device's target average latency, a global time offset usable to synchronize playing of the media item being played by the source device up to a predetermined accuracy.

Another embodiment of the present invention provides a method of synchronized playing of a streamed media item, the method comprising: playing, by a source device, a media item; selecting, by the source device, at least one target device with which to share the media item being played; determining, by a synchronization server, a source average latency for the source device and a target average latency for each of the at least one target device; and determining, by the synchronization server, for each of the at least one target device, based on the source average latency and the respective target device's target average latency, a global time offset usable to synchronize playing of the media item being played by the source device up to a predetermined accuracy.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

DETAILED DESCRIPTION OF THE INVENTION

Figure 1:
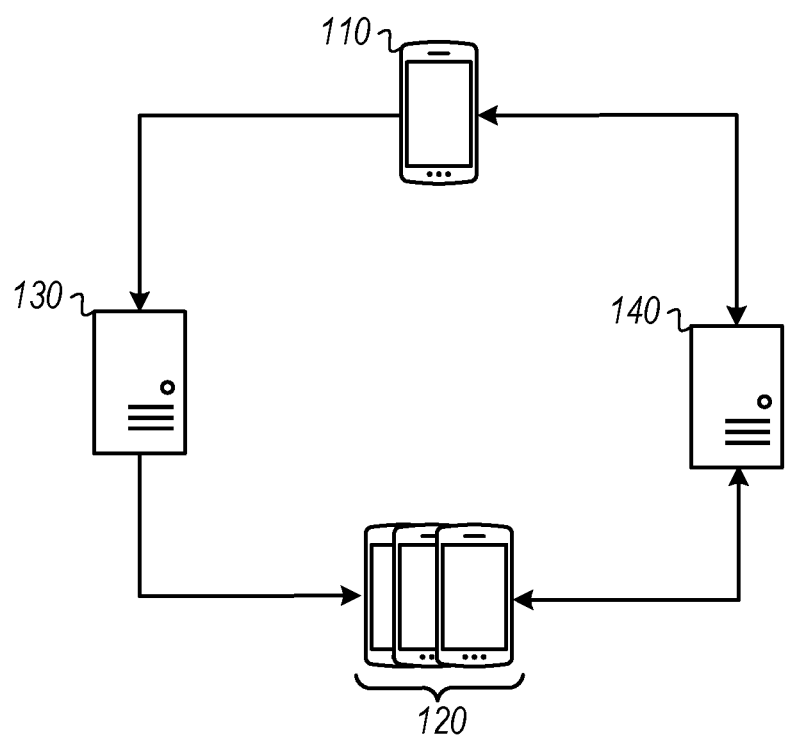
FIG. 1 is a schematic illustration of a system for synchronized playing of a streamed media item on multiple remote devices, according to some embodiments of the invention.

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented for providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable in other embodiments that can be practiced or carried out in various ways as well as in combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such data storage, transmission or display devices. Any of the disclosed modules or units can be at least partially implemented by a computer processor.

Generally, a method and system for synchronized playing of a streamed media item on multiple remote devices are provided. The system may comprise a source device arranged to play and stream a media item and arranged to select at least one target device with which to share the media item thereof. The system may comprise a synchronization server in communication with the source device and with the at least one target device. The synchronization server may be arranged to: (i) determine a source average latency for the source device and a target average latency for each of the at least one target device; and (ii) determine, for each of the at least one target device, based on the source average latency and the respective target device's target average latency, a global time offset usable to synchronize playing of the media item thereof up to a predetermined accuracy.

Reference is now made to FIG. 1, which schematically illustrates a system 100 for synchronized playing of a streamed media item on multiple remote devices (such as a source device 110 and one or more target device(s) 120), according to some embodiments of the invention.

System 100 may comprise a source device 110 arranged to play and/or stream a media item. Source device 110 may be arranged to select one or more target device(s) 120 with which to share the media item being played. In various embodiments, the media item may be, for example an audio file such as a music track, a video file such as a movie clip, a live video conference including multimedia such as audio, video and/or presentation, a virtual reality game, etc. In various embodiments, the media item may be a live or real-time item or a pre-recorded item. In various embodiments, the media item may be any non-static (e.g., dynamic) media item that may be suited for sharing with target device(s) 120.

System 100 may comprise an application server 130 in communication with source device 110 and target device(s) 120. Application server 130 may be arranged to receive synchronization ("sync") information from source device 110 and further to send a sync notification to target device(s) 120.

System 100 may comprise a synchronization server 140 in communication with source device 110 and target device(s) 120. Synchronization server 140 may be arranged to determine a source average latency for source device 110 and target average latency(s) for corresponding target device(s) 120. Synchronization server 140 may be further arranged to determine, for each of target device(s) 120, based on the source average latency and respective target average latency, a global time offset to be used to synchronize playing of the media item being played by source device 110 up to a predetermined accuracy.

Figure 2A:
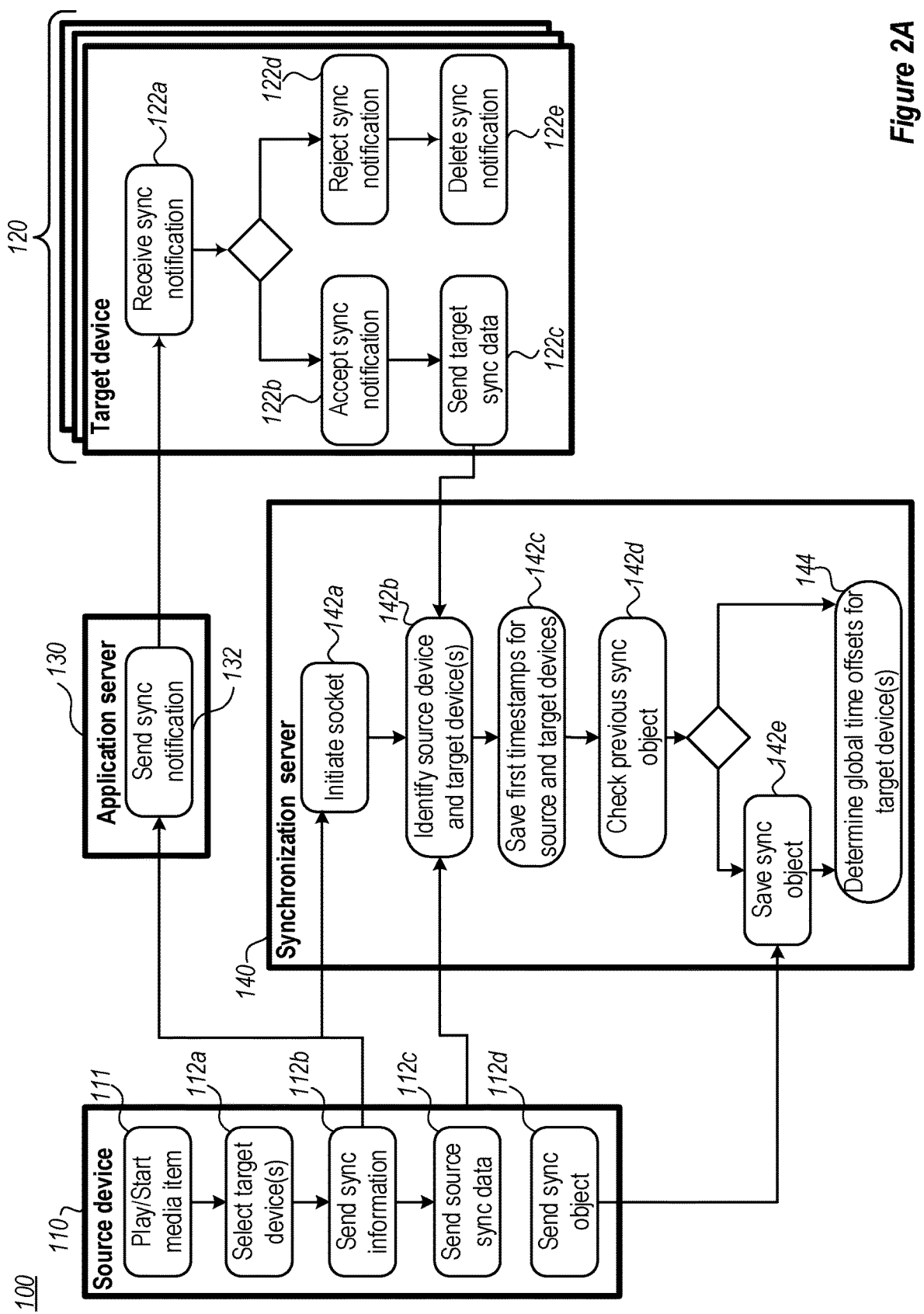
FIG. 2A is a flowchart of a method performed by a system for synchronized playing of a streamed media to initiate a connection and identify multiple remote devices by a synchronization server, according to some embodiments of the invention.

Reference is now made to FIG. 2A, which is a flowchart of a method performed by a system for synchronized playing of a streamed media, such as system 100, to initiate a connection and identify multiple remote devices, such as source device 110 and target device(s) 120, by a synchronization server, such as synchronization server 140, according to some embodiments of the invention.

Source device 110 may be arranged to play and/or stream 111 a media item (e.g., live or pre-recorded music track, video clip, etc.). Source device 110 may select 112a one or more of target device(s) 120 with which to share the media item being played. Source device 110 may generate, based on specified parameters of source device 110 and specified parameters of target device(s) 120, sync information. In some embodiments, the sync information may comprise at least one of a source device 110 identifier, target device(s) 120 identifier(s), sync identifier and/or playing media item related data (e.g., a title of the media item, artist(s) name(s), an album name, a playing source, a playing start timestamp, a playing duration, an item media year, a shared text, etc.). For example, the sync information for a music track being played by source device 110 may comprise a playing source, playing source identifier, track name, track artists, album name, track duration, track year, source device 110 identifier, target device(s) 120 identifier(s) and/or sync identifier. In various embodiments, the sync information may comprise additional parameters required to identify the media item and/or to identify source device 110.

Source device 110 may be arranged to connect to application server 130 and/or to synchronization server 140 and may be arranged to send 112b the sync information to the servers thereof.

Application server 130 may receive the sync information from source device 110. Application server 130 may generate, based on the sync information, a sync notification and further send 132 the sync notification thereof on to each of target device(s) 120. In some embodiments, the sync notification may comprise at least a portion of the sync information (e.g., the sync identifier) or data derived therefrom (e.g., an encrypted or encoded version of the synch identifier). In some embodiments, the sync notification may comprise first time-difference(s) that may be used to, for example, synchronize target device(s) 120 with source device 110 up to a certain accuracy (e.g., as described below with respect to FIG. 2B), for example in case where the process of synchronizing fails.

Target device(s) 120 may receive 122a the sync notification from application server 120. In some embodiments, at least a portion of target device(s) 120 may be in a sleep mode and the sync notification may wake up the target device(s) thereof). In various embodiments, at least a portion of target device(s) 120 may accept 122b or reject 122d the sync notification. Upon acceptance 122b of the sync notification, each of target device(s) 120 may connect and send 122c target sync data to synchronization server 140. In some embodiments, the target sync data being sent by each of target device(s) 120 may comprise, for example, at least one of a respective target device's identifier, respective target device's timestamp and/or sync identifier. Upon rejection 122d of the sync notification, target device(s) 120 may cancel and delete 122e the sync notification thereof. In various embodiments, the sync notification may be deleted 122e if there are no target device(s) 120 that are waiting for the sync notification and/or if source device 110 is no longer playing 111 the media item.

Source device 110 may further generate and send 112c source sync data to synchronization server 140. In some embodiments, the source sync data comprises at least one of a source device 110 identifier, target device(s) 120 identifier(s), source device 110 timestamp, sync identifier and/or playing media item related data (e.g., a playing start timestamp and/or playing duration).

Synchronization server 140 may receive the sync information from source device 110 and may initiate 142a a connection (e.g., a socket) with source device 110 and target device(s) 120, based on the sync information. Synchronization server 140 may further receive the source sync data from source device 110 and the target sync data(s) from target device(s) 120 (e.g., upon acceptance 122b of the sync notification). In some embodiments, synchronization server 140 may identify 142b source device 110 and target device(s) 120 based on the source sync data and the target(s) sync data, respectively. For example, source device 110 may be identified based on, for example, at least one of a source device 110 identifier, target device(s) 120 identifier(s), a source device 110 timestamp, a sync identifier and/or the media item related data and target device(s) 120 may be identified based on, for example, at least one of a target device(s) 120 identifier(s), target device(s) 120 timestamp(s), and/or sync identifier.

In some embodiments, synchronization server 140 may (during or upon identification 142b), determine and save 142c, based on the source sync data and the target sync data, a first source timestamp and first target timestamp(s) for source device 110 and for each of target device(s) 120, respectively.

Upon identification 142b of source device 110 and target device(s) 120, synchronization sever 140 may check 142d whether the synchronization server comprises a previous sync object for the identified source and target devices thereof. In some embodiments, synchronization server 140 may comprise the previous sync object (e.g., generated during former connection(s) of these specific source and target devices to the synchronization server). Alternatively or additionally, source device 110 may generate and send 112d a sync object and synchronization server 140 may receive and save 142e the sync object thereof. In some embodiments, synchronization server 140 may be configured to generate the sync object. In some embodiments, target device(s) 120 may be configured to standby while the sync object is being generated by source device 110. Each sync object is made for a specific synchronization between a source device and a specific target device that is accorded a specific sync identifier.

In some embodiment, the current sync object (and/or the previous sync object) comprises at least one of source device 110 identifier, sync identifier, playing media item related data (e.g., a title of the media item, artist(s) name(s), an album name, a playing source, a playing start timestamp, a playing duration, an item media year, a shared text, etc.), a first source time-difference and/or a source average latency of source device 110 (e.g., as described below with respect to FIG. 2B). For example, the sync object (or previous sync object) for a music track (e.g., the media item being played by source device 110) may comprise a playing source, playing source identifier, track name, track artist name(s), album name, playing duration, track year, source device 110 identifier and/or sync identifier. In various embodiments, the sync object may comprise additional parameters required to identify the media item and/or to identify source device 110 and target device(s) 120.

Upon generation of the sync object (or if synchronization server 140 comprises the previous sync object), synchronization server 140 may further determine 144, for each of target device(s) 120, a global time offset to be used to synchronize playing of the media item being played by source device 110 up to a predetermined accuracy (e.g., as described below with respect to FIG. 2B).

Figure 2B:
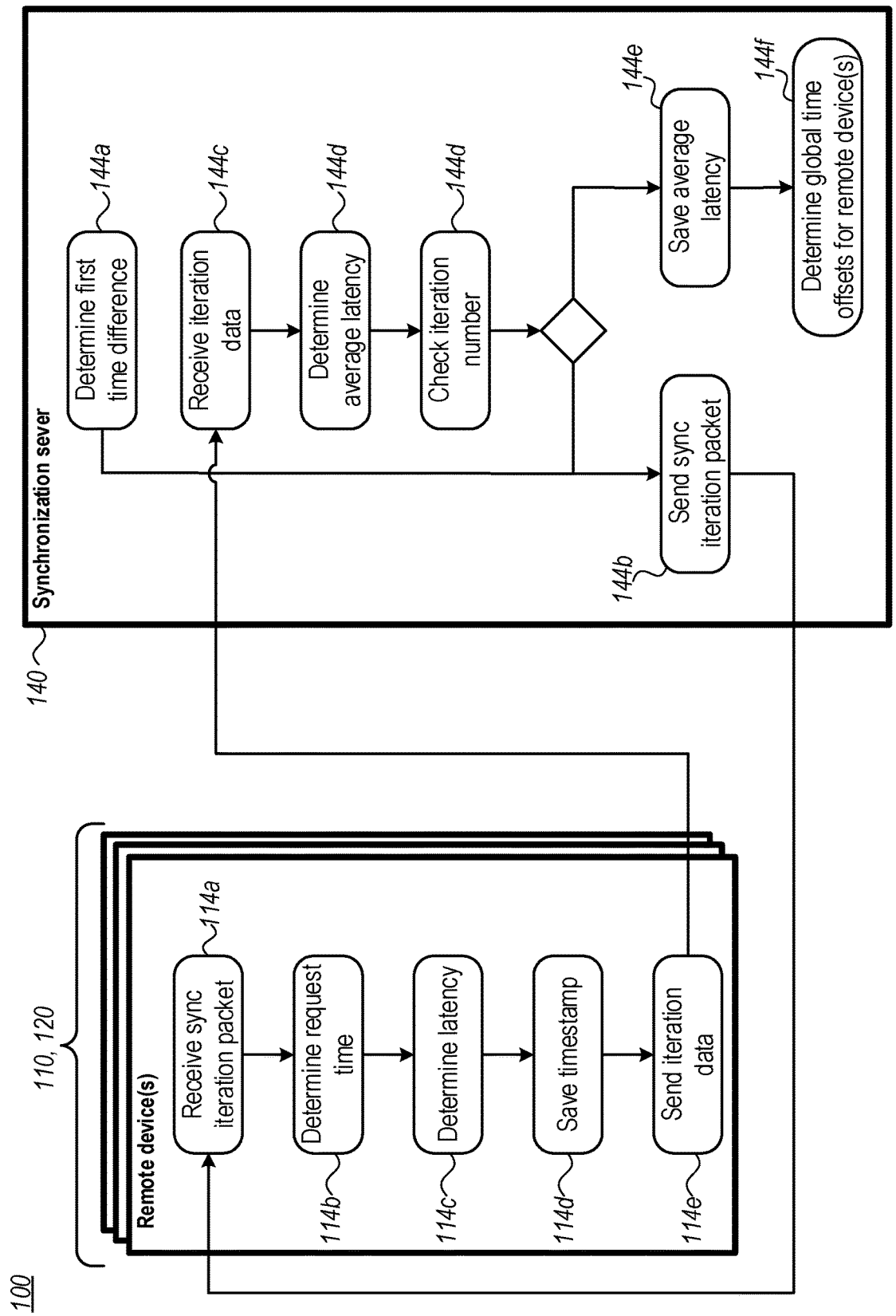
FIG. 2B is a flowchart of a method performed by a system for synchronized playing of a streamed media to determine global time offsets for multiple remote devices usable for synchronized playing of the streamed media item, according to some embodiments of the invention.

Reference is now made to FIG. 2B, which is a flowchart of a method performed by a system for synchronized playing of a streamed media, such as system 100, to determine global time offsets for multiple remote devices, such as source device 110 and target device(s) 120, usable for synchronized playing of the streamed media item, according to some embodiments of the invention.

Synchronization server 140 may determine 144a a first time-difference for each of remote device(s) based on respective remote device's first timestamp and current synchronization server's 140 timestamp. For example, synchronization server 140 may determine a first source time-difference for source device 110, based on the first source timestamp and current synchronization server's 140 timestamp (e.g., by subtracting the first source timestamp from the current synchronization server timestamp), and first target time-difference(s) for each of target device(s) 120, based on the first target timestamp(s) and the current synchronization server's 140 timestamp.

In various embodiments, the first time-difference (e.g., the first source time-difference and/or first target time-difference(s)) may range, for example, between 1 second and 1 hour. In various embodiments, the first time-differences may exceed the range thereof due to, for example, synchronization server's 140 and/or remote device's local clock disturbance. In some embodiments, the first time-difference may be due to, for example, transmission delays (e.g., latencies) and/or due to a difference in a synchronization server's 140 local time and respective remote's device local time. In various embodiments, the first time-differences may be used, for example by synchronization server 140 or by target device(s) 120, to synchronize playing of the media item being played by source device 110 across target device(s) 120 up to accuracy ranging, for example, anywhere between 1 second and 1 hour.

Synchronization server 140 and/or each of remote device(s), e.g., source device 110 and target device(s) 120, may be arranged to perform a predetermined number of sync iterations between the server and remote devices thereof. Synchronization server 140 may be arranged to determine, for each of the remote devices, an average latency (e.g., a source average latency for source device 120 and target average latency(s) for corresponding target device(s) 120). In some embodiments, the source average latency and target average latency(s) may be due to, for example, transmission delays and/or due to a difference in a synchronization server's 140 local time and respective remote device's local time.

In various embodiments, the number of sync iterations may be different for each remote device and/or may be determined by the respective remote device or by synchronization server 140. The predetermined number of sync iterations may range, for example, between 1-100. In some embodiments, increasing the number of sync iterations for the respective remote device may increase the accuracy of the respective remote device's average latency being determined, but also increase a total time of the respective remote device's average latency determination. Conversely, decreasing the number of sync iterations for the respective remote device may decrease the accuracy of the respective remote device's average latency being determined, but also decrease a total time of the respective remote device's average latency determination. In some embodiments, increasing a stability of a network may increase the accuracy of the average latency being determined.

Synchronization server 140 may send 144b, at each sync iteration, a sync iteration packet to each of the remote devices and each of the remote devices may receive 114a the sync iteration packet thereof. In some embodiments, the sync iteration packet may comprise a sync iteration packet dataset that may comprise, for example, a previous request time and current iteration index (e.g., as described below).

Each remote device (e.g., source device 110 and/or target device(s) 120) may determine 114b, at each sync iteration, a request time. In some embodiments, the request time may be determined based on a current timestamp and a previous timestamp (e.g., timestamp saved during previous sync iteration) of the respective remote device. For example, the request time may be a difference between the current timestamp and the previous timestamp of the respective remote device. In some embodiments, at a first sync iteration, the request time may be determined based on the current timestamp and the first timestamp of the respective remote device (e.g., saved 142c upon (or during) identification 142 of the remote devices, as described above with respect to FIG. 2A).

Each remote device (e.g., source device 110 and/or target device(s) 120) may determine 114c, at each sync iteration, based on the respective remote device's request time, a current latency. In some embodiments, the current latency for the respective remote device $l_i^k$ (where k is a remote device index and i is a sync iteration index) may be determined by dividing the respective remote device's request time $T_i^k$ by a factor of two (e.g., as the request time may represent the time for a signal to travel round-trip). For example, Equation 1 shows the current latency for the respective remote device as follows:

$$l_i^k = \frac{T_i^k}{2} \qquad \text{(Equation 1)}$$

Each remote device (e.g., source device 110 and/or target device(s) 120) may save 114d, at each sync interaction, the remote device's current timestamp. In some embodiments, each remote device may use the respective remote device's respective saved 114d current timestamp to determine a request time during next sync iteration.

Each remote device (e.g., source device 110 and/or target device(s) 120) may generate and send 114e, at each sync iteration, a current latency dataset to synchronization server 140. In some embodiments, the current latency dataset of the respective remote device may comprise the respective remote device's current latency (e.g., determined 114b) and the respective remote device's current iteration index (e.g., i). Synchronization server 140 may be further arranged to receive 144c, from each of the remote devices, the remote device's respective latency dataset.

Synchronization server 140 may determine 144d, for each remote device (e.g., source device 110 and/or target device(s) 120) and at each sync iteration, based on the latency dataset of the respective remote device, an average latency. In some embodiments, the average latency for the respective remote device $l_{avg}^k$ may be determined based on the respective remote device's previous average latency (e.g., an accumulated average latency calculated with respect to previous sync iterations) and the respective remote device's current latency (e.g., determined 114c and included in the remote respective device's latency dataset). For example, Equation 2 shows the average latency for respective remote device as follows:

$$l_{avg}^k = \frac{l_{avg}^k \cdot (i-1) + l_i^k}{i} \qquad \text{(Equation 2)}$$

Synchronization server 140 may check 144e, for each remote device and at each sync iteration, whether the respective remote device's current iteration index exceeds the predetermined number of sync iterations. In some embodiments (e.g., if the current iteration index does not exceed the predetermined number of sync iterations), synchronization server 140 may send 144b another sync iteration packet to the respective remote device.

Alternatively or additionally (e.g., if the current iteration index exceeds the predetermined number of sync iterations), synchronization server may save 144e, for each remote device, the respective remote device's average latency (e.g., a source average latency of source device 110 and target average latency(s) of corresponding target device(s) 120). In some embodiments, synchronization server 140 may save the source average latency of source device 110 in the sync object (e.g., saved 142e as described above with respect to FIG. 2A).

Synchronization server 140 may further determine 144f, for each of remote device(s), a global time offset, based on at least one of the source average latency, the respective target device's target average latency, the first source time-difference and/or the respective target device's first target time-difference. For example, the global time offset for each of the target device(s) 120 $\Delta T_{offset}^k$ (where k is the remote device index) may be determined based on the source average latency $l_{avg}^s$, the respective target device's target average latency device $l_{avg}^k$, the media item playing start timestamp $T_{play}^m$ (e.g., included in the sync object, as described above with respect to FIG. 2A) and the first source time difference $\Delta T^s$ (e.g., determined 144a as described above). Equation 3 shows, for example, the respective target device's global time offset:

$$\Delta T_{offset}^k = T_{play}^m + (l_{avg}^s + l_{avg}^k) - \Delta T^s \quad \text{(Equation 3)}$$

Synchronization server 140 may further send to each of remote devices the respective remote device's global time offset. In some embodiments, each of target device(s) 120 may use the respective target device's global time offset to establish a synchronized playing of the media item being played by source device 110 up to a predetermined accuracy.

In various embodiments, each of the source average latency and/or target average latency(s) may range, for example, between 1 microsecond and 10 seconds. Accordingly, in various embodiments, the source average latency and/target average latency(s) may be used, for example by synchronization server 140 or by target device(s) 120, to synchronize playing of media item being played by source device 110 across target device(s) 120 up to the predetermined accuracy ranging, for example, between 1 microsecond and 10 seconds (e.g., as described above). Other values may also be used.

Figure 3:
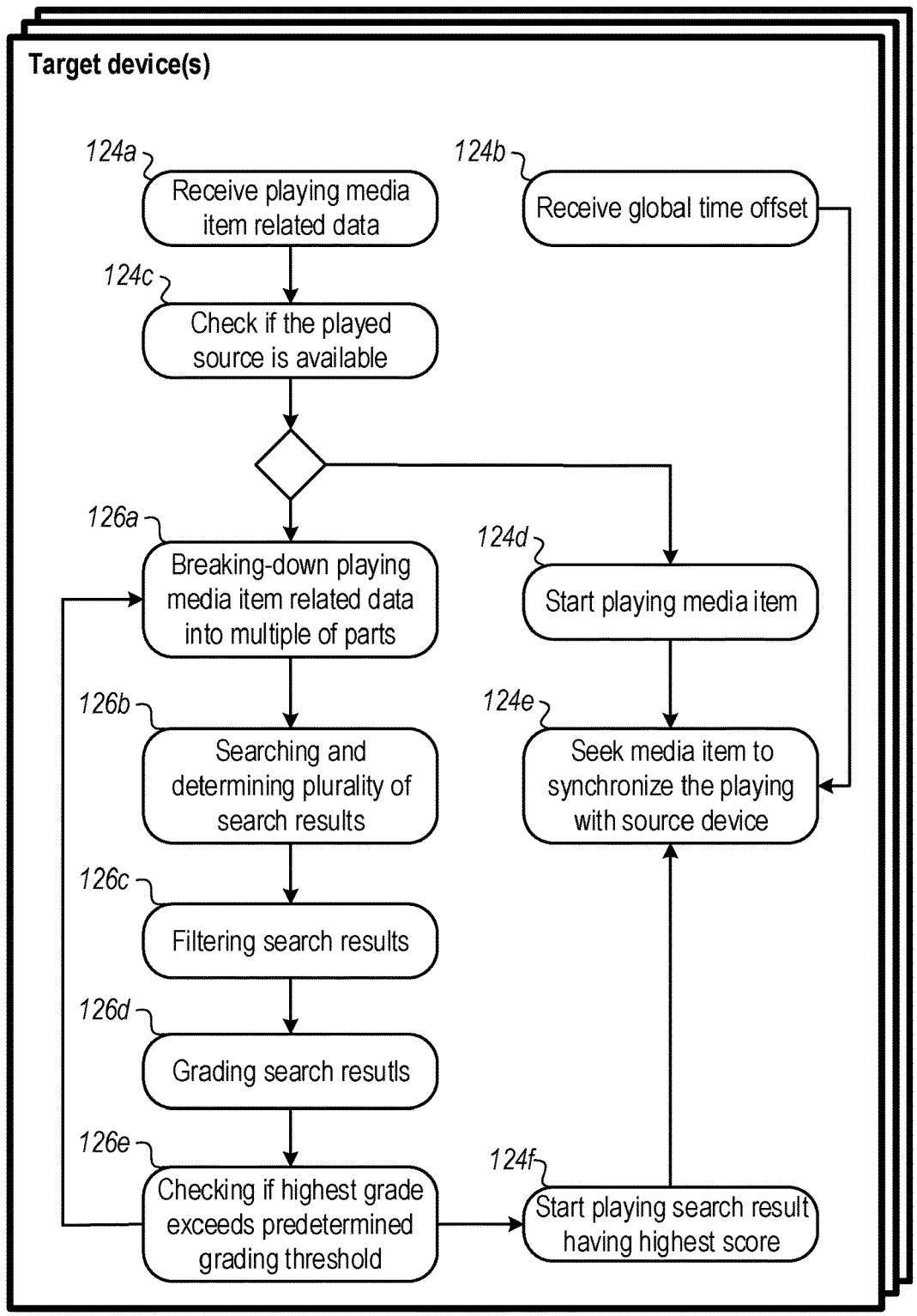
FIG. 3 is a flowchart of a method performed by the multiple remote devices of a system for synchronized playing of a streamed media to find and play, in a synchronized manner, the streamed media item, according to some embodiments of the invention.

Reference is now made to FIG. 3, which is a flowchart of a method performed by the multiple remote devices, such as target device(s) 120, of a system for synchronized playing of a streamed media, such as system 100, to find and play, in a synchronized manner, the streamed media item, according to some embodiments of the invention.

Each of target device(s) 120 may be arranged to receive 124a a playing media item related data from at least one of source device 110 (e.g., as a part of the sync information), application server 120 (e.g., as a part of the sync information) or synchronization server 140 (e.g., as a part of the sync object). The playing media item related data may comprise, for example, a playing source, playing source identifier, track name, track artists, album name, track duration, track year (e.g., as describe above with respect to FIG. 2A).

Each of target device(s) 120 may further receive 124b the respective target device's global time offset (e.g., determined 144f as described above with respect to FIG. 2B). In various embodiments, upon receipt 124a of the playing media related data and/or upon receipt 124b of the global time offset(s) by target device(s) 120, synchronization server may delete the sync object.

Target device(s) may check 124c, based on the playing media item related data, whether the media item playing source is available. In some embodiments (e.g., if the playing source is available), target device(s) 120 may load the media item playing source and start 124d playing the media item thereof. Each of target device(s) 120 may be further arranged to seek 124e the playing media item, based on the respective target device's global time offset, to synchronize the playing with source device 110.

Alternatively or additionally (e.g., if the playing source is unavailable), target device(s) 120 may be arranged to perform a smart search 126. In various embodiments, smart search 126 may be performed by synchronization server 140 and/or by a dedicated search server.

The smart search may comprise breaking-down 126a the playing media item related data into multiple parts of media item data. For example, a first part of the multiple parts of media item data may comprise the media item name, a second part of the multiple parts of media item data may comprise the media item artist(s) name(s) and/or the third part of the multiple parts of media item data may comprise the media item album name and/or year. In some embodiments, breaking-down 126a the playing media item related data into multiple parts thereof may allow performing the smart search 126 independent of current media items sources' search methods.

The smart search may comprise searching, for example through media content providers, and determining 126b, based on the multiple parts of the media item data, a plurality of search results. The search results may comprise, for example, media items. In some embodiments, some of the media content providers may be prioritized based on, for example, search results outcomes, search results file size, etc.

The smart search may comprise filtering 126c, the search results thereof, based on predetermined filtering parameters. In some embodiments, filtering 126c may comprise detecting and cleaning from the search results, for example, bad words (e.g., words that do not determine/identify the media item being played by source device 110), false media items and/or unoriginal media items. In some embodiments, filtering 126c may ensure that the search results fit original media item being played by source device 110.

The smart search may comprise grading 126d, each of the plurality of search results, based on a predetermine grading parameters. For example, search result having greater number of matchings with the multiple parts of playing media item related data may receive a higher grade as compared to another search result having smaller number of matchings multiple parts thereof. In another example, grading 126d may be performed based on search result's related data (e.g., the more related data is available, the higher is the grading).

The smart search may further comprise checking 126e whether a highest grade exceeds a predetermined grading threshold. In some embodiments (e.g., if the highest grade is below the predetermined grading threshold), the smart search may comprise breaking-down 126a the playing media item related data into additional multiple parts of media item data. The additional multiple parts may comprise, for example, re-ordering of the multiple parts and/or adding other media item parameters, depending on the media item type and/or media source types.

Alternatively or additionally (e.g., if the highest grade exceeds the predetermined threshold), each of target device(s) 120 may start playing 124f the media item associated with the search result having the highest grade. Each of target device(s) 120 may be further arranged to seek 124e the media item (e.g., the media item associated with the search result having the highest grade) being played, based on the respective target device's global time offset, to synchronize the playing with source device 110.

In some embodiments, source device 110 may finish playing 111 the media item while target device(s) 120 perform the smart search 126. In this case, according to various embodiments, target device(s) 120 may be arranged to start playing the search result from the beginning (e.g., to support current methods of sharing media items) or may be arranged to seek 124e the media item (e.g., the media item associated with the search result having the highest grade) being played, based on the respective target device's global time offset, to synchronize the playing with source device 110.

Figure 4:
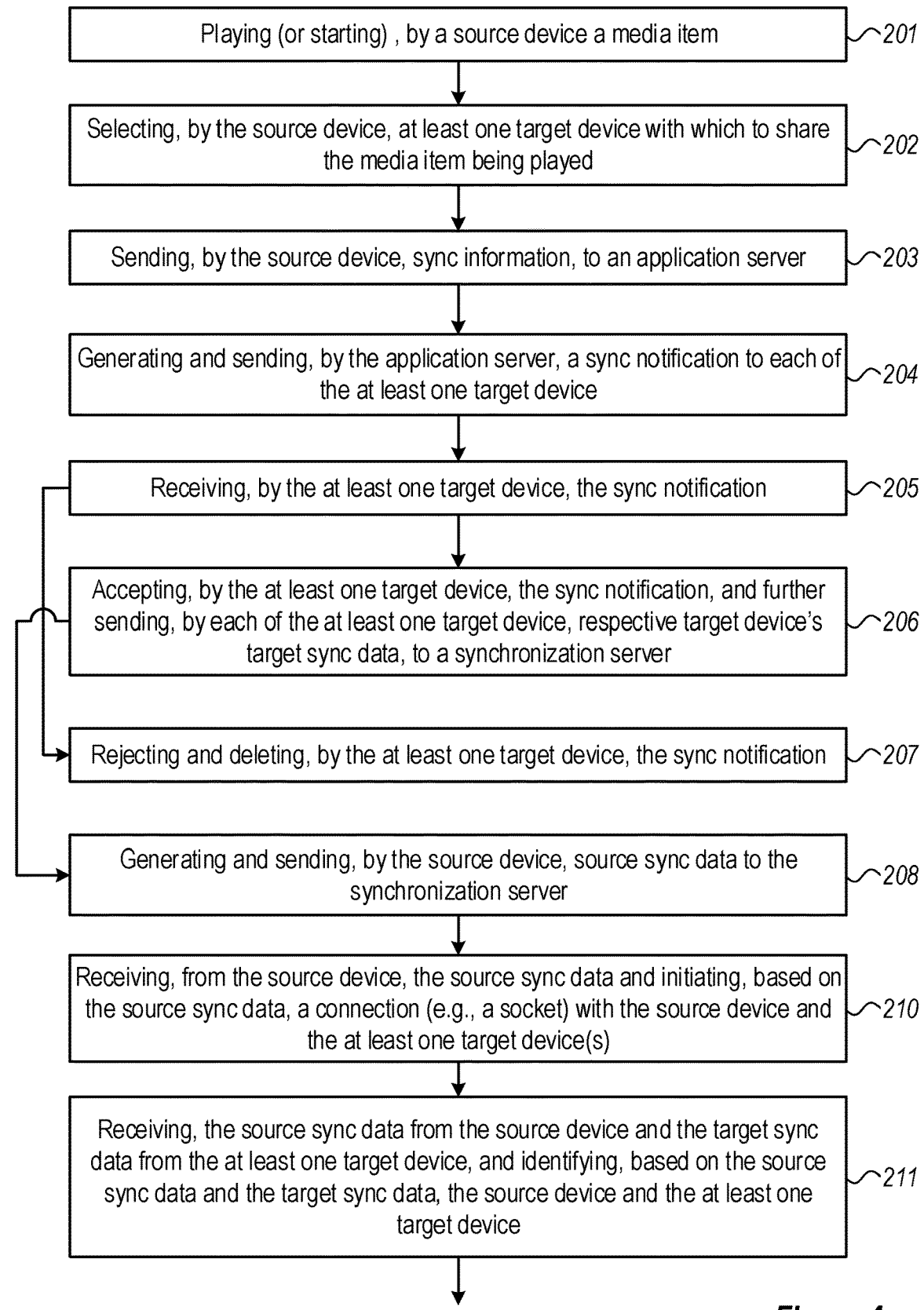
FIG. 4 is a flowchart of a method of synchronized playing of a streamed media item on multiple remote devices, according to some embodiments of the invention.

Reference is now made to FIG. 4, which is a flowchart of a method 200 of synchronized playing of a streamed media on multiple remote devices, according to some embodiments of the invention.

Method 200 may comprise playing (or starting) 201, by a source device (e.g., source device 110, as described above with respect to FIGS. 1-2), a media item. In various embodiments, the media item may be, for example an audio file such as a music track, a video file such as a movie clip, a live video conference including multimedia such as audio, video and/or presentation, a virtual reality game, etc. In various embodiments, the media item may be a live or real-time item or a pre-recorded item. In various embodiments, the media item may be any non-static (e.g., dynamic) media item that may be suited for sharing with the target device(s).

Method 200 may comprise selecting 202, by the source device, one or more target device (e.g., target device(s) 120 as described above with respect to FIGS. 1-2) with which to share the media item being played. Method 200 may comprise sending 203, by the source device, sync information, to an application server (e.g., application server 120, as described above with respect to FIGS. 1-2). In some embodiments, the sync information may comprise at least one of a source device identifier, target device(s) identifier(s), sync identifier and/or playing media item related data (e.g., a title of the media item, a playing source, a playing start timestamp, a shared text, etc.).

Method 200 may comprise generating and sending 204, by the application server, a sync notification to each of the at least one target device (e.g., as described above with respect to FIG. 2A). In some embodiments, the sync notification may comprise at least a portion of the sync information (e.g., the sync identifier) or data derived therefrom (e.g., an encrypted or encoded version of the synch identifier). In some embodiments, the sync notification may comprise a first source time-difference that may be used to, for example, synchronize target device(s) 120 with source device 110 up to a certain accuracy (e.g., as described above with respect to FIG. 2B).

Method 200 may comprise receiving 205, by the at least one target device, the sync notification. In some embodiments, method 200 may comprise accepting, by the at least one target device, the sync notification, and further sending 206, by each of the at least one target device, respective target device's target sync data, to a synchronization server (e.g., synchronization server 140, as described above with respect to FIGS. 1-2). In some embodiments, the target sync data being sent by each of the target device(s) may comprise, for example, at least one of a respective target device's identifier, respective target device's timestamp and/or sync identifier. In some embodiments, method 200 may comprise rejecting and deleting 207, by the at least one target device, the sync notification thereof. In various embodiments, the sync notification may be deleted if there are no target device(s) that are pending the sync notification and/or if the source device is no longer playing the media item. In various embodiments, at least a portion of the at least one target device may accept and some portion may reject the sync notification.

Method 200 may comprise generating and sending 208, by the source device, source sync data to the synchronization server. Method 200 may comprise receiving, from the source device, the source sync data and initiating 210, based on the source sync data, a connection (e.g., a socket) with the source device and the target device(s).

Method 200 may comprise receiving the source sync data from the source device and the target sync data from the at least one target device, and identifying 211, based on the source sync data and the target sync data, the source device and the at least one target device (e.g., as described above with respect to FIG. 2A). Method 200 may comprise determining and saving 212, by the synchronization server, based on the source sync data and the target sync data, a first source timestamp and a first target timestamp for the source device and for each of the at least one target device.

Method 200 may comprise generating and saving 214, based on the source sync data, a sync object. In some embodiments, the sync object may comprise at least one of source device identifier, sync identifier, playing media item related data (e.g., a playing source, playing source identifier, shared text, etc.) and/or a source average latency of source device. In various embodiments, method 200 may comprise generating 215 the sync object by the source device or generating 216 the sync object by the synchronization server (e.g., as described above with respect to FIG. 2A).

Method 200 may comprise determining 218 (e.g., by the synchronization server) a first time-difference for each of remote devices (such as the source device and the at least one target device), based on the respective remote device's first timestamp and current synchronization server's timestamp (e.g., as described above with respect to FIG. 2B). For example, method 200 may comprise determining a first source time-difference for the source device, based on the first source timestamp and current synchronization server's timestamp and determining first target time-difference(s) for each of the target device(s) based on the respective target device's first target timestamp and current synchronization server's timestamp.

Method 200 may comprise performing 220 a predetermined number of sync iterations between the synchronization server and each of the remote devices (e.g., the source device and the target device(s)). In some embodiments, method 200 may comprise determining 221 number of the sync iteration for each of the remote devices.

Method 200 may comprise sending 222 (e.g., by the synchronization server), at each sync iteration, a sync iteration packet to each of the remote devices and receiving the sync iteration packet by each of the remote devices thereof. Method 200 may comprise determining 223, by each remote device, at each sync iteration, a request time, based on a current timestamp and a previous timestamp of the respective remote device (e.g., as described above with respect to FIG. 2B). In some embodiments, method 200 may comprise determining, by each remote device, at a first sync iteration, the request time based on the current timestamp and the first timestamp of the respective remote device.

Method 200 may comprise determining 224, by each remote device, at each sync iteration, based on the respective remote device's request time, a current latency (e.g., as described above with respect to FIG. 2B). In some embodiments, method 200 may comprise saving, by each remote device, at each sync interaction, the respective remote device's current timestamp. In some embodiments, method 200 may comprise using, by each remote device, the respective remote device's saved current timestamp to determine a request time during next sync iteration.

Method 200 may comprise generating and sending 225, by each remote device, at each sync iteration, a current latency dataset to the synchronization server and receive the current latency datasets by the server thereof, wherein the current latency dataset of the respective remote device may comprise the respective remote device's current latency and the respective remote device's current iteration index.

Method 200 may comprise determining 226, by the synchronization server, for each remote device and at each sync iteration, based on at least one of the latency dataset of the respective remote device, the respective remote device's previous average latency and/or the respective remote device's current latency, an average latency (e.g., as described above with respect to FIG. 2B).

Method 200 may comprise saving 227, by the synchronization server, upon exceeding the predetermined number of sync iterations for each of the remote device, a source average latency for the source device and a target average latency for each of the at least one target device.

Method 200 may comprise determining 228, by the synchronization server, for each of the remote devices a global time offset, based on at least one of the source average latency, the respective target device's target average latency, the first source time-difference and the respective target device's first target time-difference (e.g., as described above with respect to FIG. 2B). In some embodiments, method 200 may comprise sending 229 to each of the remote devices the remote device's respective global time offset.

Method 200 may comprise receiving 230, by each of the at least one target device, a playing media item related data of the media item being played by the source device, from at least one of the source device, application server or synchronization server (e.g., as described above with respect to FIG. 3). In some embodiments, the playing media item related data may comprise, for example, a played source, played source identifier, track name, track artists, album name, track duration, track year.

Method 200 may comprise receiving 231, by each of the at least one target device, the respective target device's global time offset. In some embodiments, method 200 may comprise loading 232, by each of the at least one target device, a media item playing source (e.g., if the playing source is available) and playing the media item thereof. Method 200 may comprise seeking 233, by each of the at least one target device, the playing media item, based on the respective target device's global time offset, to synchronize the playing with the source device.

Method 200 may comprise performing 240, by each of the at least one target device and/or by the synchronization server, a smart search. Method 200 may comprise breaking-down 241 the playing media item related data into multiple parts of media item data (e.g., as described above with respect to FIG. 3). Method 200 may comprise searching and determining 242, based on the multiple parts of the media item data, a plurality of search results.

Method 200 may comprise filtering 243 the search results, based on predetermined filtering parameters (e.g., as described above with respect to FIG. 3). Method 200 may comprise grading 244, each of the plurality of search results, based on a predetermine grading parameters (e.g., as described above with respect to FIG. 3).

Method 200 may comprise determining 245 a search result having higher grade. In some embodiments, method 200 may comprise breaking-down 246 the playing media item related data into additional multiple parts of media item data (e.g., if the highest grade is below the predetermined grading threshold), wherein the additional multiple parts may comprise, for example, re-ordering of the multiple parts and/or adding other media item parameters, depending on the media item type and/or media source types.

Alternatively or additionally, method 200 may comprise start playing 247, by each of the at least one target device, the search result having the highest grade (e.g., if the highest grade exceeds the predetermined threshold). Method 200 may comprise seeking 248, by each of the at least one target device, the media item (e.g., the search result having the highest grade) being played, based on the respective target device's global time offset, to synchronize the playing with the source device.

In some embodiments system and methods described above may be used to enable a remote device that is not yet synchronized with the source device (a requesting remote device) to send a request to join a synchronized playing of a media played already in a synchronized manner by a source device and at least one target device. The requesting remote device may issue a sync iteration packet that may be received by, for example, application server 130 (as in FIGS. 1 and 2A) that may initiate in response sync identifying and recording process, as described for example, in steps 122*a*-122*e* in FIG. 2A. At the end of the process of obtaining the global time offset for the requesting remote device, the entire process for the requesting remote device proceeds as described above with respect to other target devices.

In some embodiments system and methods described above may enable re-synching of target device(s) with a source device following a change in the played timestamp of the media played by the source device during playing and after the target device(s) has already been synchronized with the source device. This may be useful, for example, following a change initiated by the user of the source device, e.g. by performing 'seek' operation to look for a different location in the stream of the played media. In some embodiments during a 'seek' operation, or any other situation where the source device resumes playing, and until a new time location along the media item being played has been obtained, synchronized target device(s) may experience no change in the time sync or may receive a notification that a change in the playing flow takes place. When a new time location in the streamed media has been determined by the source device, new synchronization cycle may take place, as described above.

In some embodiments, multiple synchronization cycles (e.g., as described above with respect to FIG. 2B) may take place at multiple predetermined time points (e.g., each 1-10 seconds) during playing of the streamed media item. Multiple synchronization cycles may, for example, ensure continuous and synchronized playing of the streamed media item thereof across the source and target devices.

One advantage of the present invention may comprise allowing a remote, real-time and synchronized experiencing of a shared media item across multiple remote devices. The disclosed systems and methods may allow to synchronize playing of a media item being played by a source device across multiple target devices up to a predetermined synchronization accuracy that may be, in some embodiments, as good (i.e. small) as 1 microsecond. The predetermined accuracy is achieved due to multiple sync iterations between a synchronization server and each of source and target devices performed to determine an average latency for each of the devices thereof. Multiple sync iterations may enable, for example, minimizing an effect of extremely high latencies due to, for example, various network peaks, to thereby improve the predetermined accuracy. Moreover, multiple synchronization cycles may take place at multiple predetermined time points during playing of the shared media item to, for example, ensure continuous and synchronized playing of the media item thereof across the source and target devices.

Another advantage of the present invention is that it provides software solution for synchronized playing of a media item across multiple remote devices, which eliminates a need in using dedicated hardware synchronizers (e.g., Bluetooth).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer non-transitory readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for synchronized playing of a streamed media item, the system comprising:
   a source device arranged to play and stream a media item and arranged to select at least one target device physically independent from the source device with which to synchronically share the media item being played, the at least one target device being arranged to play and stream the media item; and
   a synchronization server physically independent from the source device and from the at least one target device and in communication with the source device and with the at least one target device, the synchronization server being arranged to:
   determine, for each of the at least one target device, a source average latency for the source device and a target average latency; and
   determine, for each of the at least one target device, based on the source average latency and the respective target device's target average latency, a global time offset usable to synchronize playing of the media item being played by the source device up to a predetermined accuracy,
   wherein the predetermined accuracy is achieved by performing multiple sync iterations between the synchronization server and the source and target device(s) to determine an average latency for the devices,
   wherein, at the first sync iteration, a request time is determined based on a current timestamp and a first timestamp of the respective source device and/or target device(s) saved upon or during identification of the source device and/or target device(s),
   wherein, at each sync iteration, a current latency of the source device and/or target device(s) is determined based on the respective request time of the source device and/or target device(s),
   wherein, upon identification of the source device and the at least one target device, the synchronization server checks whether the synchronization server includes a previous sync object for the identified source and the at least one target device generated during a former connection of the specific source and the at least one target device to the synchronization server,
   wherein the sync object includes a source average latency for the source device and additional parameters required to identify the media item, and
   wherein, if the synchronization server includes the previous sync object, the synchronization server further determines, for each of the at least one target device(s), the global time offset to be used to synchronize playing of the media item being played by the source device up to a predetermined accuracy.

2. The system of claim 1, wherein the synchronization server is further arranged to seek, by each of the at least one target device, the media item being played by the source device, based on the respective target device's global time offset.

3. The system of claim 1, wherein the synchronization server is further arranged to determine, upon connection of the source device and each of the at least one target device, a first source time-difference and respective first target time difference, respectively, based on a source device's timestamp synchronization server's timestamp and based on respective target device's timestamp and the timestamp synchronization server's timestamp, respectively.

4. The system of claim 3, wherein the synchronization server is further arranged to determine the global time offset for each of the at least one target device, based on the first source time-difference and the respective target device's first target difference.

5. The system of claim 1, wherein the synchronization server is arranged to perform a predetermined number of sync iterations with the source device and a predetermined number of sync iterations with each of the at least one target device to thereby determine the source average latency and the respective target device's target average latency, respectively.

6. The system of claim 5, wherein the number of sync iterations is determined to increase an accuracy of the source average latency and the respective target device's target average latency being determined.

7. The system of claim 1, wherein at least one of the synchronization server, the at least one target device or a dedicated search server is arranged to perform a smart search comprising:
   breaking-down a playing media item related data of the media item being played by the source device into multiple parts of media item data;
   determining, based on the multiple parts of media item data, a plurality of search results; and
   grading, based on predetermined grading parameters, each of the plurality of search results.

8. The system of claim 7, wherein the smart search further comprising filtering the plurality of search results, based on predetermined filtering parameters.

9. The system of claim 7, wherein each of the at least one target device is arranged to play a search result having a highest grade and further to seek the search result thereof, based on the respective target device's global time offset, to thereby synchronize the playing with the source device.

10. The system of claim 1, further comprising an application server in communication with the source device and the at least one target device, the application server is arranged to send a notification request to each of the at least one target device to thereby wake up the respective target device and to initiate the connection of the respective target device with the synchronization server.

11. A method of synchronized playing of a streamed media item, the method comprising:
   playing, by a source device, a media item;
   selecting, by the source device, at least one target device physically independent from the source device with which to share the media item being played;
   determining, by a synchronization server that is physically independent from the source device and from the at least one target device, a source average latency for the source device and a target average latency for each of the at least one target device;
   determining, by the synchronization server, for each of the at least one target device, based on the source average latency and the respective target device's target average latency, a global time offset usable to synchronize playing of the media item being played by the source device up to a predetermined accuracy,
      wherein the predetermined accuracy is achieved by performing multiple sync iterations between the synchronization server and the source and target device(s) to determine an average latency for the devices,
      wherein, at the first sync iteration, a request time is determined based on a current timestamp and a first timestamp of the respective source device and/or target device(s) saved upon or during identification of the source device and/or target device(s),
      wherein, at each sync iteration, a current latency of the source device and/or target device(s) is determined based on the respective request time of the source device and/or target device(s),
      wherein, upon identification of the source device and the at least one target device, the synchronization server checks whether the synchronization server includes a previous sync object for the identified source and the at least one target device generated during a former connection of the specific source and the at least one target device to the synchronization server,
      wherein the sync object includes a source average latency for the source device and additional parameters required to identify the media item, and
      wherein, if the synchronization server includes the previous sync object, the synchronization server further determines, for each of the at least one target device(s), the global time offset to be used to synchronize playing of the media item being played by the source device up to a predetermined accuracy, and
   synchronizing, up to the predetermined accuracy and using the global time offset, playing of the media item by the source device and the at least one target device.

12. The method of claim 11, further comprising seeking, by each of the at least one target device, the media item being played by the source device, based on the respective target device's global time offset.

13. The method of claim 11, further comprising determining, by the synchronization server, upon connection of the source device and each of the at least one target device, a first source time-difference and respective first target time-difference, respectively, based on a source device's timestamp synchronization server's timestamp and based on respective target device's timestamp and the timestamp synchronization server's timestamp, respectively.

14. The method of claim 13, further comprising determining, by the synchronization server, the global time offset for each of the at least one target device, based on the first source time-difference and the respective target device's first target difference.

15. The method of claim 11, further comprising performing, by the synchronization server, a predetermined number of sync iterations with the source device and a predetermined number of sync iterations with each of the at least one target device to thereby determine the source average latency and the respective target device's target average latency, respectively.

16. The method of claim 15, further comprising determining, by the synchronization server, the number of sync iterations to increase an accuracy of the source average latency and the target average latency.

17. The method of claim 11, further comprising performing, by at least one of the synchronization server, the at least one target device or a dedicated search server a smart search, the smart search comprising:
breaking-down a playing media item related data of the media item being played by the source device into multiple parts of media item data;
determining, based on the multiple parts of media item data, a plurality of search results; and
grading, based on a predetermine grading parameters, each of the plurality of search results.

18. The method of claim 17, further comprising filtering the plurality of search results, based on predetermined filtering parameters.

19. The method of claim 17, further comprising playing, by each of the at least one target device, a search result having a highest grade and seeking, by each of the at least one target device, the search result thereof, based on the respective global time offset, to thereby synchronize the playing with the source device.

20. A system for synchronized playing of a streamed media item, the system comprising:
a synchronization server, the synchronization service being configured to:
be in communication with each of a source device and with at least one target device physically independent from the source device and selected by the source device, each of the source device and the at least one target device being physically independent from the synchronization server;
determine a source average latency for the source device and a target average latency for each of the at least one target device; and
determine, for each of the at least one target device, based on the source average latency and the respective target device's target average latency, a global time offset usable to synchronize, up to a predetermined accuracy, playing of a media item being streamed and played by the source device,
wherein the predetermined accuracy is achieved by performing multiple sync iterations between the synchronization server and the source and target device(s) to determine an average latency for the devices,
wherein, at the first sync iteration, a request time is determined based on a current timestamp and a first timestamp of the respective source device and/or target device(s) saved upon or during identification of the source device and/or target device(s),
wherein, at each sync iteration, a current latency of the source device and/or target device(s) is determined based on the respective request time of the source device and/or target device(s),
wherein, upon identification of the source device and the at least one target device, the synchronization server checks whether the synchronization server includes a previous sync object for the identified source and the at least one target device generated during a former connection of the specific source and the at least one target device to the synchronization server,
wherein the sync object includes a source average latency for the source device and additional parameters required to identify the media item, and
wherein, if the synchronization server includes the previous sync object, the synchronization server further determines, for each of the at least one target device(s), the global time offset to be used to synchronize playing of the media item being played by the source device up to a predetermined accuracy.

21. The system of claim 20, wherein one of a plurality of media content providers is selected for providing the media item for streaming and playing the media item using the at least one target device.

22. The method of claim 11, further comprising selecting one of a plurality of media content providers to provide the media item for streaming and playing the media item using the at least one target device.

* * * * *